J. G. LUDLUM.
DISPLAY ROLL FOR FLAT METAL TABLEWARE.
APPLICATION FILED JUNE 21, 1921.
1,423,483.
Patented July 18, 1922.
2 SHEETS—SHEET 1.
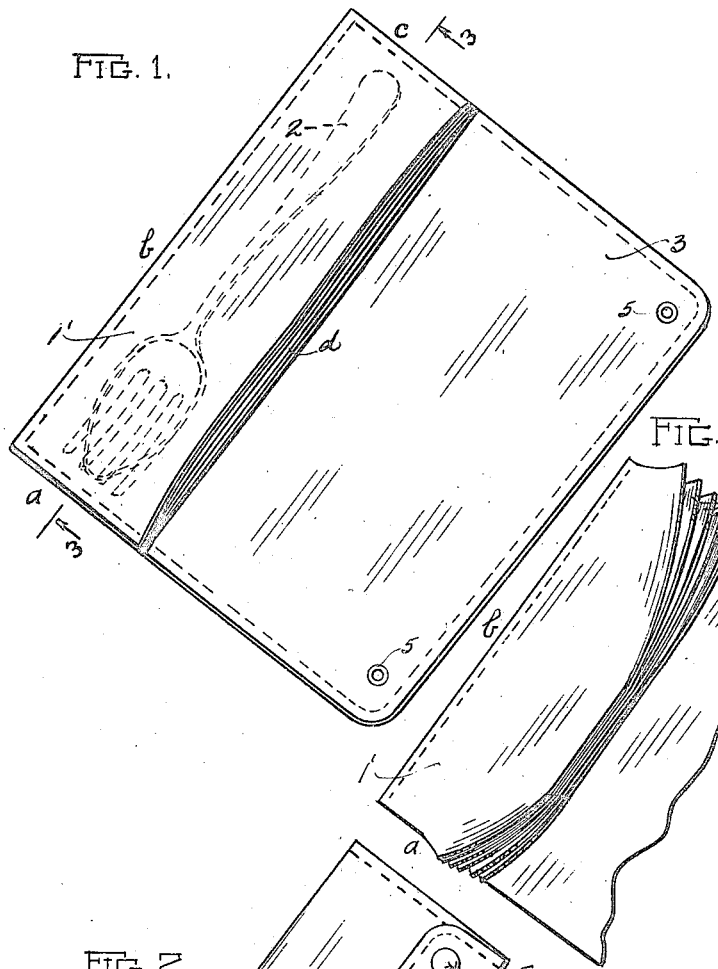
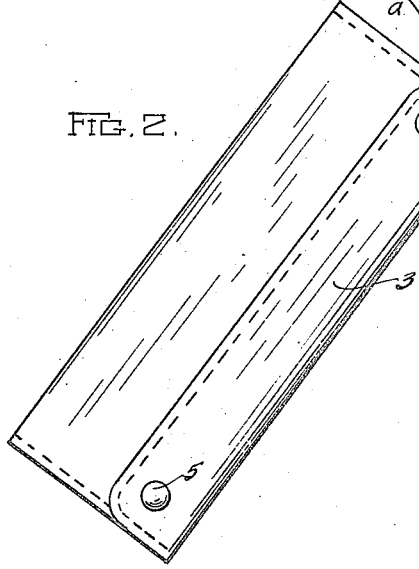
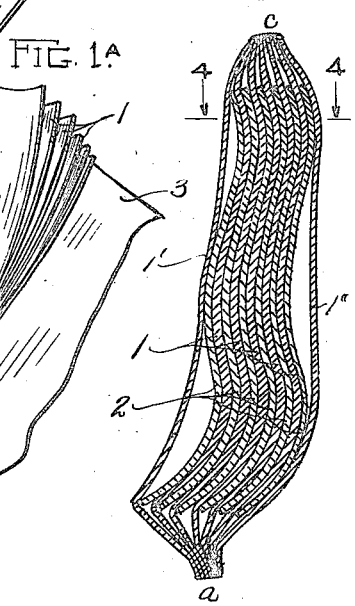
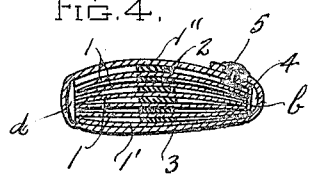
INVENTOR
James G. Ludlum
BY
A. M. Wooster
ATTORNEY J. G. LUDLUM.
DISPLAY ROLL FOR FLAT METAL TABLEWARE.
APPLICATION FILED JUNE 21, 1921.
1,423,483.
Patented July 18, 1922.
2 SHEETS—SHEET 2.
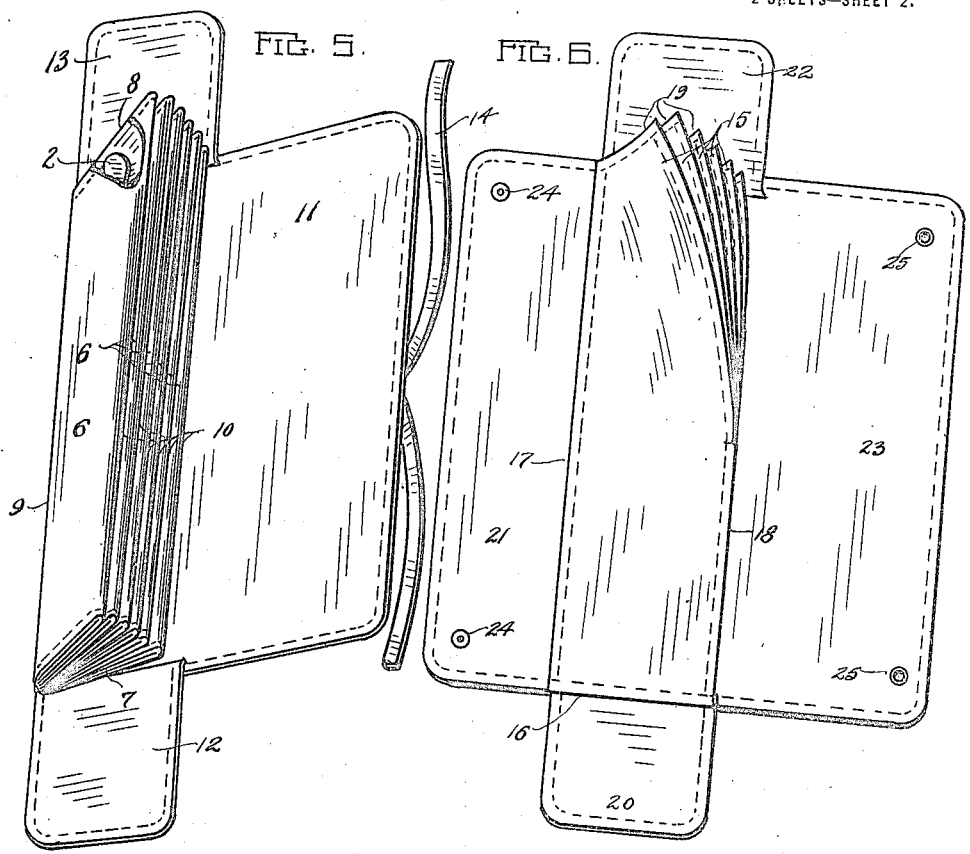
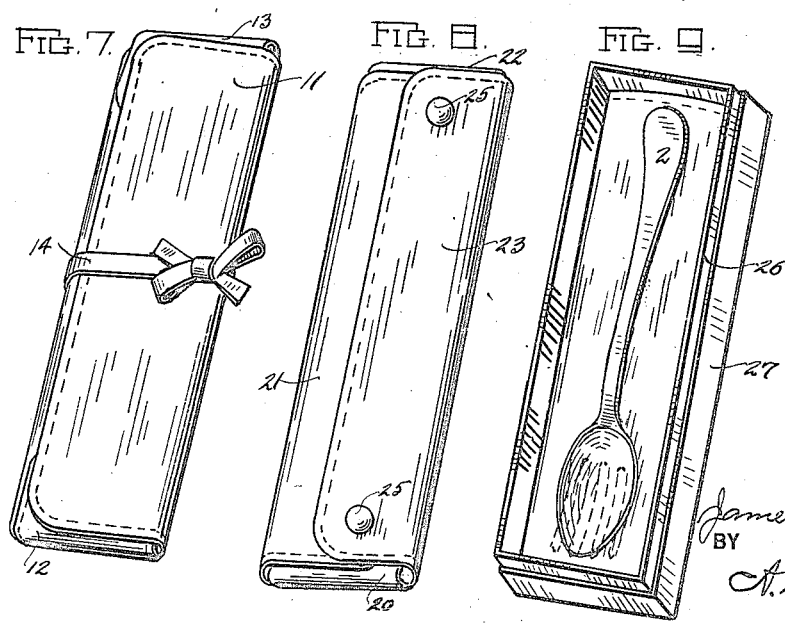
INVENTOR
James G. Ludlum
BY
A. M. Wooster
ATTORNEY